(12) United States Patent
Imazeki

(10) Patent No.: US 9,394,131 B2
(45) Date of Patent: Jul. 19, 2016

(54) ROLLER FOR FEEDING, CONVEYING, AND SEPARATING PAPER, AND MANUFACTURING METHOD THEREFOR

(71) Applicant: SYNZTEC CO., LTD., Tokyo (JP)

(72) Inventor: Naoya Imazeki, Kanagawa (JP)

(73) Assignee: SYNZTEC CO., LTD., Tokyo (JP)

( * ) Notice: Subject to any disclaimer, the term of this patent is extended or adjusted under 35 U.S.C. 154(b) by 0 days.

(21) Appl. No.: 14/621,714

(22) Filed: Feb. 13, 2015

(65) Prior Publication Data

US 2015/0232295 A1    Aug. 20, 2015

(30) Foreign Application Priority Data

Feb. 17, 2014   (JP) ................................ 2014-027922

(51) Int. Cl.
| | |
|---|---|
| *B65H 27/00* | (2006.01) |
| *B65G 39/02* | (2006.01) |
| *B65H 3/06* | (2006.01) |

(52) U.S. Cl.
CPC .............. *B65H 27/00* (2013.01); *B65H 3/0638* (2013.01); *B65G 39/02* (2013.01); *B65H 2401/111* (2013.01); *B65H 2402/80* (2013.01); *B65H 2404/18* (2013.01)

(58) Field of Classification Search
CPC ........ B65H 27/00; B65H 5/06; B65H 3/0638; B65H 2404/18; B65H 2404/181; B65G 39/02
USPC ................................ 492/56; 271/109; 193/37
See application file for complete search history.

(56) References Cited

U.S. PATENT DOCUMENTS

| | | | | |
|---|---|---|---|---|
| 4,287,649 A * | 9/1981 | Kohler | ................... | B65H 27/00 492/56 |
| 4,416,650 A * | 11/1983 | Wilkins | ................. | B65G 39/02 198/789 |
| 5,725,209 A * | 3/1998 | Takahashi | ............ | B65H 3/5261 271/109 |
| 5,893,210 A * | 4/1999 | Takei | ........................ | B28B 1/24 264/274 |
| 6,044,963 A * | 4/2000 | Lerch | ...................... | B29C 45/16 193/35 F |
| 6,117,257 A * | 9/2000 | Takahashi | ............... | B29C 63/18 156/272.2 |
| 6,319,181 B1 * | 11/2001 | Naoi | ..................... | B29C 59/165 492/53 |
| 6,406,784 B1 * | 6/2002 | Cerrah | ............... | G03G 15/2057 428/325 |
| 6,523,262 B1 * | 2/2003 | Kaprelian | ................ | B05D 7/14 29/895.21 |
| 6,640,866 B2 * | 11/2003 | Kerr | ....................... | B41J 13/103 156/308.2 |
| 7,284,649 B2 * | 10/2007 | Shiraki | .................. | B65H 27/00 193/35 R |
| 8,453,831 B1 * | 6/2013 | Thimmel | ............... | B65G 39/02 198/842 |
| 8,550,696 B2 * | 10/2013 | Ebers | .................. | B01F 11/0008 366/111 |

FOREIGN PATENT DOCUMENTS

| | | |
|---|---|---|
| JP | 06-080269 | 3/1994 |
| JP | 08-211774 | 8/1996 |

* cited by examiner

*Primary Examiner* — Mark A Deuble
(74) *Attorney, Agent, or Firm* — Young & Thompson

(57) ABSTRACT

The present invention provides a paper feed/convey/separation roller in which the inner layer is firmly fixed to the outer layer without use of an adhesive and slipping between the inner layer and the outer layer is suppressed, and which ensures required running torque, and a method for producing the roller. In the paper feed/convey/separation roller having a shaft and at least two rubber elastic layers formed on the shaft, said at least two layers including an outermost layer formed of non-foamed polyurethane, and an inner layer disposed under the outermost layer and formed of foamed rubber, wherein the polyurethane outermost layer has an inner surface having unevenness at least along the circumferential direction, which unevenness is provided through molding.

11 Claims, 6 Drawing Sheets

ROLLER FOR FEEDING, CONVEYING, AND SEPARATING PAPER, AND MANUFACTURING METHOD THEREFOR

The entire disclosure of Japanese Patent Application No. 2014-027922 filed on Feb. 17, 2014 is expressly incorporated by reference herein.

BACKGROUND OF THE INVENTION

1. Field of the Invention

The present invention relates to a roller for feeding, conveying, and/or separating paper (hereinafter referred to as a "paper feed/convey/separation roller") which is employed in a paper-feeding apparatus of various printers such as an inkjet printer and a laser printer; various office automation (OA) apparatuses such as a copier and a facsimile; an automatic teller machine; etc., and which has at least one function among paper feeding, paper conveying, and paper separating, and to a method for producing the roller.

2. Background Art

Generally, a belt or a roller for conveying paper money, film, magnetic cards, and the like in an automatic ticket gate, an automatic teller machine, a money changer, and the like must be designed in consideration of wear resistance, oil-swell resistance, environmental impact, etc. Particularly, paper feed/convey/separation rollers for use in various OA machines must have excellent conveying capacity and high wear resistance. Therefore, EPDM (ethylene propylene diene monomer rubber) has been conventionally employed as a material for rollers having high mechanical strength and high friction coefficient.

OA machines of recent years can be operated for a long period and are employed for high-speed operation. Under such conditions, EPDM is not a satisfactory material for rollers, since sufficient wear resistance fails to be attained, which is problematic. From the viewpoint of excellent wear resistance, studies are underway on use of urethane material for producing a paper feed/convey/separation rollers. Furthermore, there have been proposed rollers employing the characteristics of different types of rubber; for example, a roller having an outer layer made of non-foamed urethane or a like material, and an inner layer made of a foamed material (see, for example, Patent Documents 1 and 2).

However, in production of the roller disclosed in Patent Document 1, an inner layer must be fixed to an outer layer by the mediation of an adhesive. The roller disclosed in Patent Document 2 is produced by molding an inner layer with an outer layer through vulcanization without use of an adhesive. However, bonding effect is insufficient, and the two layers slip with respect to each other in long-term use, thereby failing to gain sufficient running torque. Thus, these rollers have problems.

Patent Document 1: Japanese Patent Application Laid-Open (kokai) No. 1994-80269
Patent Document 2: Japanese Patent Application Laid-Open (kokai) No. 1996-211774

SUMMARY OF THE INVENTION

Under such circumstances, an object of the present invention is to provide a paper feed/convey/separation roller in which the inner layer is firmly fixed to the outer layer without use of an adhesive and slipping between the inner layer and the outer layer is suppressed, and which ensures required running torque. Another object is to provide a method for producing the roller.

In a first aspect of the present invention to attain the aforementioned objects, there is provided a paper feed/convey/separation roller comprising a shaft and at least two rubber elastic layers formed on the shaft, said at least two layers including an outermost layer formed of non-foamed polyurethane, and an inner layer disposed under the outermost layer and formed of foamed rubber, wherein the polyurethane outermost layer has an inner surface having unevenness at least along the circumferential direction, which unevenness is provided through molding.

According to the first aspect of the invention, the unevenness provided through molding on the inner surface of the outermost layer serves as an anchor with respect to the inner layer, whereby foamed rubber of the inner layer sticks to the uneven surface. Thus, the inner layer is strongly fixed to the outermost layer without use of an adhesive, and slipping between the inner layer and the outermost layer can be suppressed. In addition, the first aspect of the invention ensures sufficient running torque, which cannot be attained by a conventional paper feed/convey/separation roller in which the inner layer is fixed to the outer layer only by the mediation of repulsion force of foamed rubber of the inner layer.

The outermost layer preferably has a thickness of 0.5 mm to 2.0 mm.

When the thickness falls within the range, the uneven surface is suitably formed on the inner surface of the outermost layer. In this case, fixation of the inner layer to the outermost layer can be ensured.

The rubber forming the foamed rubber is preferably at least one member selected from among ethylene propylene diene monomer rubber, nitrile rubber, butyl rubber, urethane rubber, and silicone rubber.

When the foamed rubber is of one or more of the above species, the foamed rubber firmly sticks to the uneven surface formed on the inner surface of the outermost layer through molding. In this case, firm fixation of the inner layer to the outermost layer can be ensured.

The unevenness preferably assumes an emboss pattern, a pattern knurled orthogonal to a circumferential direction, or a pattern knurled oblique to a circumferential direction.

When the uneven surface has the above pattern, the entire inner surface of the outermost layer is uniformly provided with grooves (concavities), and the grooves serve as anchors to the inner layer. Thus, stronger fixation of the inner layer to the outermost layer can be ensured.

In a second aspect of the present invention, there is provided a method for producing a paper feed/convey/separation roller having a shaft and at least two rubber elastic layers formed on the shaft, wherein the method comprises:

injecting non-foamed polyurethane into a mold and curing the polyurethane, to thereby form an outermost layer having an inner surface having unevenness at least along the circumferential direction;

inserting a shaft into a space defined by the outermost layer along the center axis;

disposing a foamable rubber composition between the outermost layer and the shaft; and curing the foamable rubber composition, to thereby form an inner layer formed of foamed rubber.

According to the second aspect of the present invention, an uneven surface is formed on the inner surface of the outermost layer, and then the foamable rubber composition is foamed between the outermost layer and the shaft, whereby the uneven surface is filled with foamed rubber. Thus, the inner layer can be firmly fixed to the outermost layer without use of an adhesive, and slipping between the inner layer and the outermost layer can be suppressed. In addition, required running torque can be ensured.

The present invention realizes provision of a paper feed/convey/separation roller in which the inner layer is firmly fixed to the outer layer without use of an adhesive and slipping between the inner layer and the outer layer is suppressed, and which ensures required running torque, as well as a method for producing the roller.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF PREFERRED EMBODIMENTS

The present invention will next be described in detail with reference to embodiments.

Figure 1A:
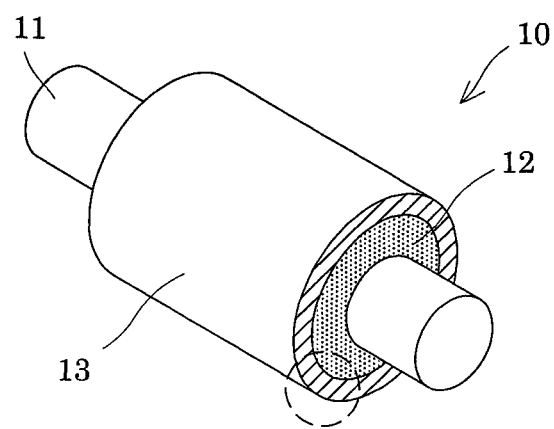
FIG. 1A is a schematic perspective view of a paper feed/convey/separation roller according to Embodiment 1.
Figure 1B:
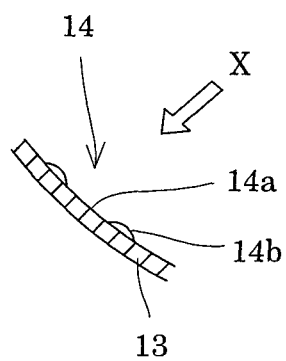
FIG. 1B is an enlarged view of a required part of the paper feed/convey/separation roller.
Figure 2:
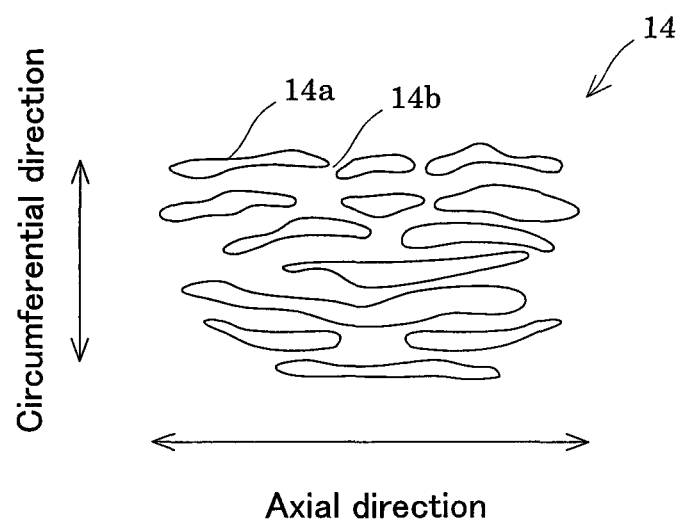
FIG. 2 is a schematic view of the inner surface of the outermost layer shown in FIG. 1B, as viewed from direction X.

FIG. 1A is a schematic perspective view of a paper feed/convey/separation roller, and FIG. 1B is an enlarged view of a required part of the outermost layer of the paper feed/convey/separation roller. FIG. 2 is a schematic view of the inner surface of the outermost layer shown in FIG. 1B, as viewed from direction X.

A paper feed/convey/separation roller (hereinafter may be simply referred to as a "roller") 10, falling within a scope of the present invention, has a shaft 11 and at least two rubber elastic layers formed on the shaft. As shown in FIG. 1A, the roller 10 of Embodiment 1 includes two rubber elastic layers; i.e., an inner layer 12 disposed on the shaft 11, and an outermost layer 13 disposed on the inner layer 12. The inner layer 12 is formed of foamed rubber, and the outermost layer 13 is formed of non-foamed polyurethane.

The inner surface of the outermost layer 13; i.e., the inner surface of the non-foamed polyurethane layer, is provided with an uneven surface 14 formed of dents 14a and protrusions 14b, through molding. In Embodiment 1, as shown in FIG. 2, the uneven surface 14 assumes an embossed pattern. The uneven surface 14 is formed along the circumferential direction and axial direction of the roller 10. The dents 14a of the embossed pattern are provided such that the dents have portions extending along the axial direction. In one method of forming the uneven surface 14, non-foamed polyurethane serving as a material of the outermost layer 13 is injected into a mold which has been already provided with a concavo-convex shape, and the polyurethane is cured by heat.

Next, the thus-formed outermost layer 13 is placed in a mold, and a rubber composition containing a foaming agent (hereinafter referred to as a "foamable rubber composition") is foamed to thereby form foamed rubber, while the shaft 11 is disposed at the center of the mold along the axial direction. Through the foaming step, the uneven surface 14 is filled with the foamed rubber. As a result, the inner layer 12 is bonded to the outermost layer 13 via vulcanization. The uneven surface 14 formed on the inner surface of the outermost layer 13 serves as an anchor with respect to the inner layer 12, whereby the inner layer 12 is more firmly adhered to the outermost layer 13 via vulcanization. Thus, strong fixation of the inner layer 12 to the outermost layer 13 can be ensured without use of an adhesive, and slipping between the inner layer 12 and the outermost layer 13 can be suppressed in long-term use. In addition, a certain level of running torque, which cannot be attained by a conventional paper feed/convey/separation roller, can be ensured. Notably, in Embodiment 1, the uneven surface 14 has the aforementioned embossed pattern surface, wherein the entire inner surface of the outermost layer 13 is uniformly provided with long grooves (the dents 14a) along the axial direction. Through employment of such long grooves as anchors with respect to the inner layer 12, the inner layer 12 can be fixed to the outermost layer 13 in a more sure and firm manner.

Examples of preferred non-foamed polyurethanes forming the outermost layer 13 include polyether-polyurethane, polyester-polyurethane, and polycarbonate-polyurethane. Among them, preferred is a so-called mold-type non-foamed polyurethane, which is produced through reaction between polyol and polyisocyanate. Examples of the isocyanate to be reacted with polyol include 3-function isocyanate monomers such as triphenylmethane triisocyanate, tris(isocyanatophenyl)thiophosphate, and bicycloheptane triisocyanate; polyisocyanates (trimer: 3-function, pentamer: 4-function) such as cyanurate-modified hexamethylene diisocyanate; and a mixture of polymeric diphenylmethane diisocyanate. Alternatively, a mixture of the polyisocyanate of ≥3-functionality and a generally used 2-function isocyanate compound may be used. Examples of the 2-function isocyanate compound include 2,4-toluene diisocyanate (TDI), 4,4'-diphenylmethane diisocyanate (MDI), p-phenylene diisocyanate (PPDI), 1,5-naphthalene diisocyanate (NDI), and 3,3-dimethyl diphenyl-4,4'-diisocyanate (TODI), and a modified product or an oligomer of a prepolymer with each end capped by the isocyanate.

The outermost layer 13 preferably has a thickness of 0.5 mm to 2.0 mm. When the thickness is smaller than 0.5 mm, difficulty is encountered in forming, through molding, the uneven surface 14 on the inner surface of the outermost layer 13, whereas when the thickness is greater than 2.0 mm, fixation of interest between the inner layer 12 and the outermost layer 13 fails to be attained, and the effect of suppressing slipping between the inner layer 12 and the outermost layer 13 cannot be fully attained.

As the material of the foamed rubber forming the inner layer 12, a foamable rubber composition containing a known rubber base and a foaming agent is suitably used. Foamed rubber is produced through heating the foamable rubber composition to cure. No particular limitation is imposed on the rubber base of the foamed rubber. Examples of the rubber base includes ethylene propylene diene monomer rubber (EPDM), nitrile rubber (NBR), butyl rubber, urethane rubber, silicone rubber, epichlorohydrin rubber, styrene rubber (SBR), and chloroprene rubber. Of these, at least one member selected from among ethylene propylene diene monomer rubber (EPDM), nitrile rubber (NBR), butyl rubber, urethane rubber, and silicone rubber is preferred, from the viewpoints of filling adaptability to the uneven surface 14 and enforced fixation strength to the outermost layer 13 (non-foamed polyurethane). The foaming agent may be a known one, for example, water, organic solvent, or a Freon substitute. This foaming agent may be used in combination of two or more species. The foam units provided in the inner layer 12 may be communicated with or isolated from one another.

No particular limitation is imposed on the width, depth, and height of the dents 14a and protrusions 14b defining the uneven surface 14, so long as they are formed on the inner surface of the outermost layer 13 at least along the circumferential direction, and the uneven surface 14 is filled with the foamed rubber forming the inner layer 12. Needless to say, the sizes of the dents 14a and protrusions 14b may vary. The dents 14a and protrusions 14b may also be provided in a single set or a plurality of sets, along the axial direction.

Preferably, each dent 14a is provided such that it has a part extending along the axial direction. As a result, the uneven surface 14 reliably serves as an anchor to the inner layer 12, whereby the inner layer 12 can be strongly fixed to the outermost layer 13. The dent 14a is preferably provided at as deep a level as possible, so long as the mold can be released from the inner surface. Under such conditions, the difference between the dent depth and the protrusion height is preferably as large as possible. Notably, the term "axial direction" also encompasses any direction inclined at about 45° or less with respect to the shaft 11 of the roller 10.

No particular limitation is imposed on the shape of the uneven surface 14, so long as the inner surface of the outermost layer 13 can be provided with the uneven surface 14. The unevenness 14 preferably assumes an emboss pattern, pattern knurled orthogonal to a circumferential direction, or a pattern knurled oblique to a circumferential direction. When the unevenness 14 is an emboss pattern, a pattern knurled orthogonal to a circumferential direction, or a pattern knurled oblique to a circumferential direction, the entire inner surface of the outermost layer 13 can be uniformly provided with the dents 14a, whereby firm fixation between the inner layer 12 and the outermost layer 13 is ensured.

Figure 3A:
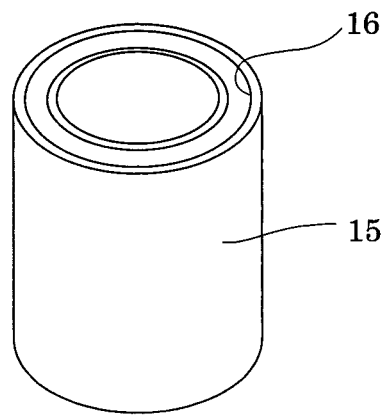
FIGS. 3A to 3C are schematic perspective views showing the production method for the paper feed/convey/separation roller according to Embodiment 1.

Next will be described the method of the present invention for producing a roller, with reference to FIGS. 3 and 4. As shown in FIG. 3(a), a metal mold 15 for producing the outermost layer is provided. The metal mold 15 for producing the outermost layer is a cylinder having almost the same inner and outer diameters as the outermost layer 13. The outer peripheral portion of the metal mold provides a cylindrical cavity 16 into which the raw material of the outermost layer 13 is injected. One end of the cylindrical cavity 16; i.e., the port into which the raw material of the outermost layer 13 is injected, is opened, and the other end is closed so as to avoid leakage of the raw material, by means of a seal member or the like (not illustrated).

The inner surface of the metal mold 15 for producing the outermost layer has been provided in advance with unevenness (an uneven surface). The inner surface of the outermost layer 13 is formed so as to follow the unevenness pattern. Thus, the outermost layer 13 having the uneven surface 14 as the inner surface can be formed. In Embodiment 1, the uneven surface 14 has an embossed pattern.

Figure 3B:
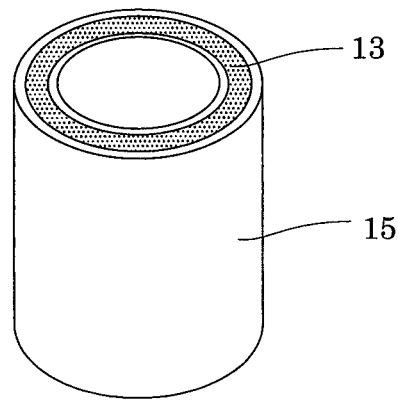
Figure 3C:
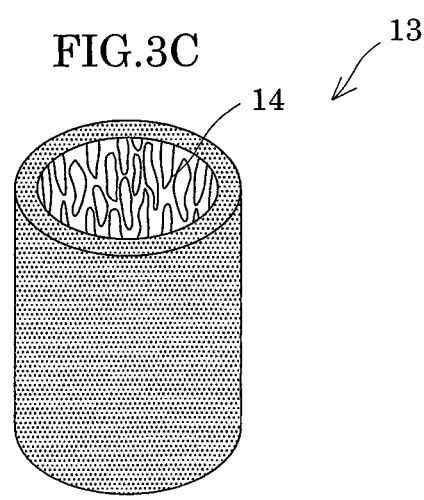

Subsequently, as shown in FIG. 3(b), the metal mold 15 for producing the outermost layer is heated in advance, and the raw material of the outermost layer 13; i.e., non-foamed polyurethane, is injected into the cylindrical cavity 16, followed by thermally curing. Thereafter, the cured polyurethane is released by cooling from the cavity, to thereby produce the outermost layer 13 having an embossed uneven surface 14 as the inner surface, as shown in FIG. 3(c). The uneven surface 14 serves as an anchor with respect to the inner layer 12, which is to be provided under the outermost layer 13.

Figure 4A:
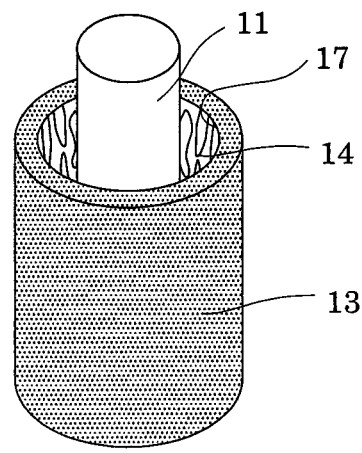
FIGS. 4A and 4B are schematic perspective views showing the production method for the paper feed/convey/separation roller according to Embodiment 1.

Then, as shown in FIG. 4(a), the shaft 11 is disposed at the center of the outermost layer 13 by means of a supporting member (not illustrate) or the like. As a result, a cylindrical cavity 17 is provided between the outermost layer 13 and the shaft 11. To the cavity 17, the raw material of the inner layer 12; i.e., a foamable rubber composition, is to be injected. Notably, one end of the cylindrical cavity 17; i.e., the port into which the foamable rubber composition is injected, is opened, and the other end is closed by a seal member or the like (not illustrated).

Figure 4B:
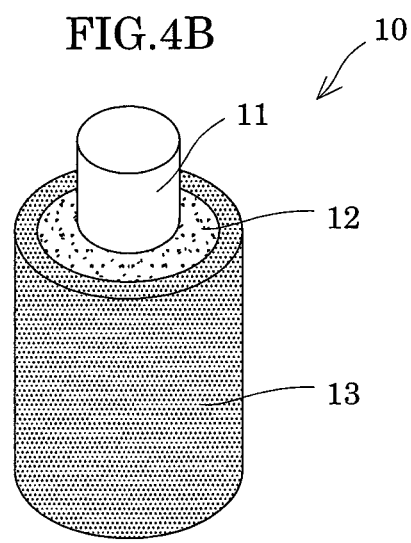

Then, as shown in FIG. 4(b), the foamable rubber composition is injected into the cylindrical cavity 17, and the composition is foamed and thermally cured, to thereby form the inner layer 12 made of foamed rubber. When the foamable rubber composition is foamed between the outermost layer 13 and the shaft 11, the uneven surface 14 serving as the inner surface of the outermost layer 13 is filled with foamed rubber. Thus, the inner layer 12 is adhered to the outermost layer 13 via vulcanization. In Embodiment 1, the embossed uneven surface 14 serves as an anchor to the inner layer 12, whereby adhesion by vulcanization is enforced. Thus, there can be produced the roller 10 of a double-layer structure composed of the outermost layer 13 having the embossed uneven surface 14 serving as the inner surface, and the inner layer 12 disposed under the outermost layer.

According to the method of the present invention for producing the roller 10, the uneven surface 14 is formed on the inner surface of the outermost layer 13, and then the foamable rubber composition is foamed between the outermost layer 13 and the shaft 11. As a result, the uneven surface 14 can serve as an anchor with respect to the inner layer 12, whereby the uneven surface 14 is filled with foamed rubber (inner layer 12). Thus, the inner layer 12 can be firmly fixed to the outermost layer 13 without use of an adhesive, and slipping between the inner layer 12 and the outermost layer 13 can be suppressed. In addition, required running torque can be ensured.

Embodiment 2

Figure 5:
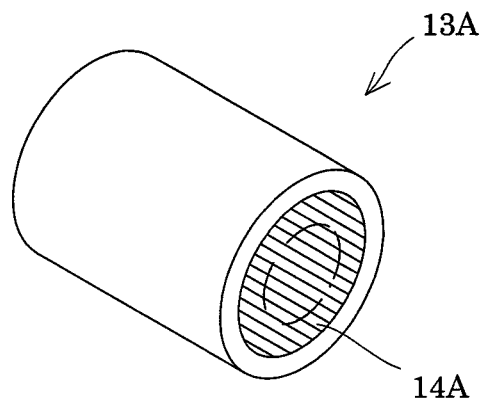
FIG. 5 is a schematic perspective view of the outermost layer of the paper feed/convey/separation roller according to Embodiment 2.

FIG. 5 is a schematic perspective view of the outermost layer of the roller according to Embodiment 2. In FIG. 5, the same members as employed in Embodiment 1 are denoted by the same reference numerals, and overlapping descriptions are omitted. As shown in FIG. 5, the uneven surface 14A formed on the inner surface of the outermost layer 13A has a pattern knurled orthogonal to a circumferential direction. The uneven surface 14A having the knurled pattern is formed of long grooves (dents) extending along the axial direction. In Embodiment 2, the long grooves serve as anchors with respect to the inner layer 12, whereby the inner layer 12 is firmly fixed to the outermost layer 13A, and slipping between the inner layer 12 and the outermost layer 13A is suppressed.

Embodiment 3

Figure 6:
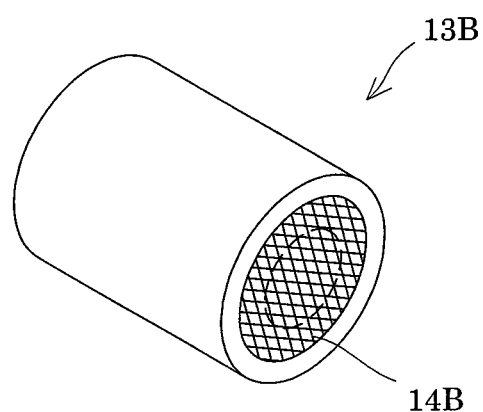
FIG. 6 is a schematic perspective view of the outermost layer of the paper feed/convey/separation roller according to Embodiment 3.

FIG. 6 is a schematic perspective view of the outermost layer of the roller according to Embodiment 3. In FIG. 6, the same members as employed in Embodiment 1 are denoted by the same reference numerals, and overlapping descriptions are omitted. As shown in FIG. 6, the uneven surface 14B formed on the inner surface of the outermost layer 13B has a pattern knurled oblique to a circumferential direction. The uneven surface 14B having the knurled pattern is formed of oblique-pattern grooves (dents) extending along the circumferential and the axial directions of the outermost layer 13, and the width of each groove is greater in the axial direction than in the circumferential direction. In Embodiment 3, the oblique-pattern grooves serve as anchors with respect to the inner layer 12, whereby the inner layer 12 is firmly fixed to the outermost layer 13B, and slipping between the inner layer 12 and the outermost layer 13B is suppressed.

Embodiment 4

Figure 7:
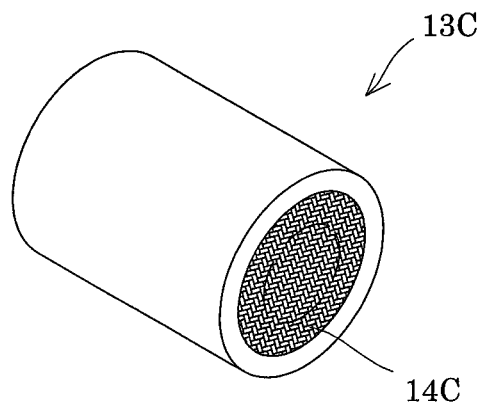
FIG. 7 is a schematic perspective view of the outermost layer of the paper feed/convey/separation roller according to Embodiment 4.

FIG. 7 is a schematic perspective view of the outermost layer of the roller according to Embodiment 4. In FIG. 7, the same members as employed in Embodiment 1 are denoted by the same reference numerals, and overlapping descriptions are omitted. As shown in FIG. 7, the uneven surface 14C formed on the inner surface of the outermost layer 13C is formed of grooves (dents) extending along the circumferential and axial directions of the outermost layer 13C, and the widths of each groove in the axial direction and in the circumferential direction are smaller than those of Embodiments 1 to 3. Embodiment 4, the narrow grooves serve as anchors with respect to the inner layer 12, whereby the inner layer 12 is firmly fixed to the outermost layer 13C, and slipping between the inner layer 12 and the outermost layer 13C is suppressed.

The present invention will next be described in detail by way of examples, which should not be construed as limiting the invention thereto.

EXAMPLES

Example 1

A double-layer roller having an outermost layer (inner diameter: 18 mm, thickness: 1.0 mm) and an inner layer (inner diameter: 12 mm, thickness: 3.0 mm) was fabricated by use of a cylindrical metal mold. The outermost layer employed was formed of a non-foamed polyurethane produced through reaction between an ester diol and an aromatic diisocyanate. The inner surface of the outermost layer was provided with an embossed pattern having a surface roughness $R_z$ (JIS B0601-1994) of 65.

The inner layer employed was formed of a foamed rubber produced through foaming of a foamable rubber composition containing ethylene propylene diene monomer rubber (EPDM) and a foaming agent. In addition to the foamable rubber composition, the inner layer was adhered to the outermost layer through vulcanization, to thereby fix the outermost layer to the inner layer.

Comparative Example 1

The procedure of Example 1 was repeated, except that no embossing was performed to the inner surface of the outermost layer, to thereby produce a similar roller.

Test Example 1

Figure 8:
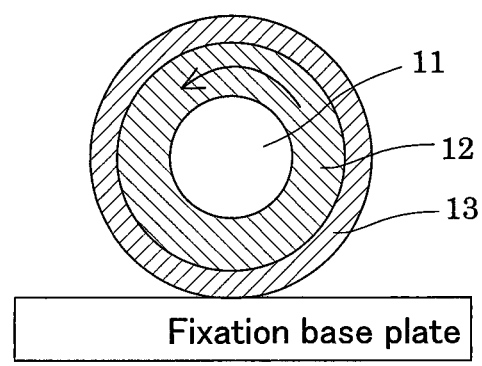
FIG. 8 is a sketch showing the method of measuring torque between the inner layer and the outermost layer.

The degree of fixation between the inner layer and the outermost layer of each of the rollers of Example 1 and Comparative Example 1 was evaluated by measuring the torque between the inner layer and the outermost layer. FIG. 8 is a sketch showing the method of measuring torque. Firstly, the roller of Example 1 or Comparative Example 1 was fixed on a fixation base plate shown in FIG. 8 such that the outermost layer of the roller is fixed on the base plate. Then, a shaft was inserted into the space defined by the inner layer of the roller. To one end of the shaft, a torque gauge (not illustrated) was attached, and outer force was applied toward the direction indicated by an arrow. A torque (kgf·cm) at which the shaft started to rotate was measured and employed as the torque between the inner layer and the outermost layer. The measurement was performed twice for two samples of the roller of Example 1 or Comparative Example 1. TABLE 1 shows the results.

As shown in TABLE 1, in the case of the roller of Example 1 having an embossed inner surface, no slipping between the inner layer and the outermost layer was observed, and the outermost layer was broken. In this case, the torque between the inner layer and the outermost layer was twice the torque measured for the roller of Comparative Example 1 having a non-embossed inner surface. Thus, through adhesion of the inner layer to the outermost layer via vulcanization, while the inner surface of the outermost layer has been embossed, firm fixation of the inner layer to the outermost layer can be attained without use of an adhesive. A roller having such an inner layer and an outermost layer ensures suppression of slipping between the inner layer and the outermost layer, as well as required running torque, during use for a long operation period.

TABLE 1

| | | Torque (kgf · cm) | State of outermost layer after torque measurement |
|---|---|---|---|
| Example 1 | Sample 1 | 2.0 | broken |
| | Sample 2 | 1.9 | |
| Comparative Example 1 | Sample 3 | 1.0 | no broken |
| | Sample 4 | 0.9 | |

What is claimed is:
1. A paper roller comprising:
a shaft; and
at least two rubber elastic layers formed on the shaft, said at least two layers including an outermost layer formed of non-foamed polyurethane, and an inner layer disposed under the outermost layer and formed of foamed rubber, the polyurethane outermost layer having an inner surface having unevenness at least along the circumferential direction, the inner surface having been released from a mold, the unevenness being provided through molding in the mold.

2. The paper roller according to claim 1, wherein the outermost layer has a thickness of 0.5 mm to 2.0 mm.

3. The paper roller according to claim 2, wherein the rubber forming the foamed rubber is at least one member selected from among ethylene propylene diene monomer rubber, nitrile rubber, butyl rubber, urethane rubber, and silicone rubber.

4. The paper roller according to claim 2, wherein the unevenness assumes an emboss pattern, a pattern knurled orthogonal to a circumferential direction, or a pattern knurled oblique to a circumferential direction.

5. The paper roller according to claim 1, wherein the rubber forming the foamed rubber is at least one member selected from among ethylene propylene diene monomer rubber, nitrile rubber, butyl rubber, urethane rubber, and silicone rubber.

6. The paper roller according to claim 5, wherein the unevenness assumes an emboss pattern, a pattern knurled orthogonal to a circumferential direction, or a pattern knurled oblique to a circumferential direction.

7. The paper roller according to claim 1, wherein the unevenness assumes an emboss pattern, a pattern knurled orthogonal to a circumferential direction, or a pattern knurled oblique to a circumferential direction.

8. The paper roller according to claim 1, wherein the inner layer is attached to the inner surface of the outermost layer without adhesive.

9. A paper roller comprising:
   a shaft; and
   at least two rubber elastic layers formed on the shaft, said at least two layers including an outermost layer formed of non-foamed polyurethane, and an inner layer disposed under the outermost layer and formed of foamed rubber, the polyurethane outermost layer having an inner surface having unevenness at least along the circumferential direction, the unevenness assuming an emboss pattern, a pattern knurled orthogonal to a circumferential direction, or a pattern knurled oblique to a circumferential direction.

10. A method for producing a paper roller having a shaft and at least two rubber elastic layers formed on the shaft, the method comprising:
    injecting non-foamed polyurethane into a mold and curing the polyurethane, to thereby form an outermost layer having an inner surface having unevenness at least along the circumferential direction, the unevenness being provided through molding in the mold;
    releasing the inner surface from the mold;
    inserting a shaft into a space defined by the outermost layer along the center axis;
    disposing a foamable rubber composition between the outermost layer and the shaft; and
    curing the foamable rubber composition, to thereby form an inner layer formed of foamed rubber.

11. The method according to claim 10, further comprising attaching the inner layer to the inner surface of the outermost layer without adhesive.

* * * * *